US012641047B2

(12) United States Patent
Giovanardi et al.

(10) Patent No.: US 12,641,047 B2
(45) Date of Patent: May 26, 2026

(54) RECOMMENDATION AND SUMMARIZATION OF UNREAD MESSAGES

(71) Applicant: Zoom Video Communications, Inc., San Jose, CA (US)

(72) Inventors: Davide Giovanardi, San Jose, CA (US); Venkata Diwakara Nagu Kotra, Tracy, CA (US); Bilung Lee, San Jose, CA (US); Shamil Chollampatt Muhammed Ashraf, Singapore (SG); Vijay Venkataswamy Parthasarathy, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/139,051

(22) Filed: Apr. 25, 2023

(65) Prior Publication Data

US 2024/0364653 A1    Oct. 31, 2024

(51) Int. Cl.
*H04L 51/216* (2022.01)
*H04L 51/212* (2022.01)
*H04L 51/224* (2022.01)

(52) U.S. Cl.
CPC .......... *H04L 51/216* (2022.05); *H04L 51/212* (2022.05); *H04L 51/224* (2022.05)

(58) Field of Classification Search
CPC .... H04L 51/216; H04L 51/224; H04L 51/212
USPC ........................................................ 709/206
See application file for complete search history.

(56) References Cited

U.S. PATENT DOCUMENTS

| | | | | |
|---|---|---|---|---|
| 9,306,887 | B1* | 4/2016 | Brunetti | H04L 67/306 |
| 9,438,551 | B1* | 9/2016 | Devasthali | H04L 51/08 |
| 11,455,555 | B1* | 9/2022 | Gill | G06N 20/00 |
| 2013/0298084 | A1* | 11/2013 | Spivack | H04L 65/403 |
| | | | | 705/14.67 |
| 2015/0012601 | A1* | 1/2015 | Mawatari | H04L 51/224 |
| | | | | 709/206 |
| 2016/0191444 | A1* | 6/2016 | Penilla | H04L 51/42 |
| | | | | 709/206 |
| 2018/0083907 | A1* | 3/2018 | Perlow | H04L 51/216 |
| 2019/0386937 | A1* | 12/2019 | Kim | G06F 40/268 |

(Continued)

FOREIGN PATENT DOCUMENTS

CN        111596830 A        8/2020

OTHER PUBLICATIONS

EP International Search Report and Written Opinion for PCT/US2024/021646 mailed Jun. 25, 2024.

*Primary Examiner* — Moustafa M Meky
*Assistant Examiner* — Kidest Mendaye
(74) *Attorney, Agent, or Firm* — Kilpatrick Townsend & Stockton LLP

(57) ABSTRACT

Example methods and systems recommend and summarize unread messages for a user on an online chat platform. A client device accesses multiple unread messages associated with the user, and a machine learning (ML) model provided by the online chat platform. The client device selects one or more unread messages from the multiple unread messages using the ML model trained with historical chat data and user metadata. The client device also generates a summary of some or all of the unread messages using a second ML model trained with the historical chat data and the user metadata. The indication of the selected unread messages and the summary of unread messages are displayed on the client device.

19 Claims, 11 Drawing Sheets

1000

ACCESS MULTIPLE UNREAD MESSAGES ASSOCIATED WITH A USER VIA AN ONLINE CHAT PLATFORM — 1002

SELECT ONE OR MORE UNREAD MESSAGES FROM THE MULTIPLE UNREAD MESSAGES USING A FIRST MACHINE LEARNING (ML) MODEL — 1004

PROVIDE AN INDICATION OF THE ONE OR MORE UNREAD MESSAGES — 1006

GENERATE A SUMMARY OF AT LEAST ONE OF THE ONE OR MORE UNREAD MESSAGES USING A SECOND ML MODEL — 1008

PROVIDE THE SUMMARY OF THE AT LEAST ONE OF THE ONE OR MORE UNREAD MESSAGES — 1010

(56)         References Cited

U.S. PATENT DOCUMENTS

| | | | |
|---|---|---|---|
| 2020/0153776 A1* | 5/2020 | Qiu | G06F 9/542 |
| 2020/0195604 A1* | 6/2020 | Hassan | H04L 51/56 |
| 2020/0218770 A1* | 7/2020 | Tu | G06F 16/953 |
| 2020/0396191 A1* | 12/2020 | Yang | H04M 1/72436 |
| 2021/0044559 A1* | 2/2021 | Jain | H04L 51/216 |
| 2022/0124464 A1* | 4/2022 | Greene | H04L 51/216 |
| 2022/0199079 A1* | 6/2022 | Hanson | H04L 51/02 |
| 2022/0417197 A1 | 12/2022 | Kim | |
| 2023/0214111 A1* | 7/2023 | Qu | G06F 3/04817 |
| | | | 715/835 |
| 2023/0246858 A1* | 8/2023 | Etheridge | H04L 12/1818 |
| | | | 709/204 |
| 2024/0113990 A1* | 4/2024 | Palraj | G06Q 30/0631 |
| 2024/0176960 A1* | 5/2024 | Maurer | G06F 16/345 |

* cited by examiner

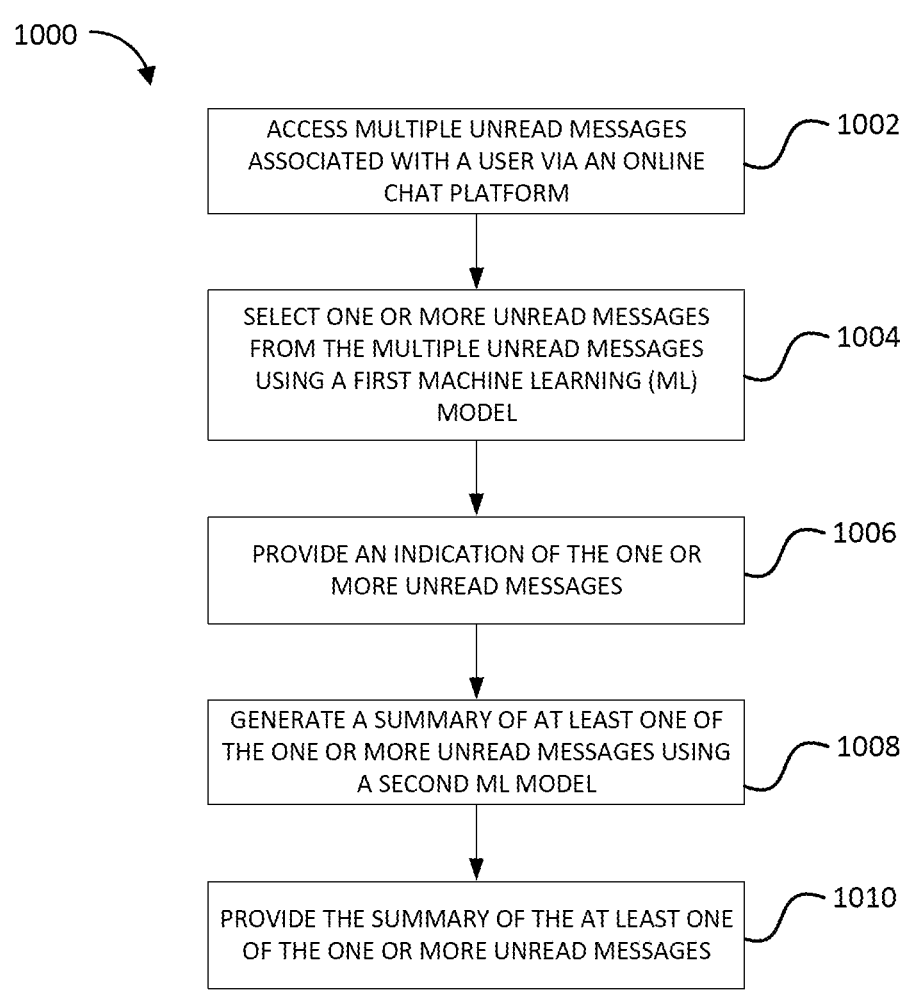

1000

ACCESS MULTIPLE UNREAD MESSAGES ASSOCIATED WITH A USER VIA AN ONLINE CHAT PLATFORM — 1002

SELECT ONE OR MORE UNREAD MESSAGES FROM THE MULTIPLE UNREAD MESSAGES USING A FIRST MACHINE LEARNING (ML) MODEL — 1004

PROVIDE AN INDICATION OF THE ONE OR MORE UNREAD MESSAGES — 1006

GENERATE A SUMMARY OF AT LEAST ONE OF THE ONE OR MORE UNREAD MESSAGES USING A SECOND ML MODEL — 1008

PROVIDE THE SUMMARY OF THE AT LEAST ONE OF THE ONE OR MORE UNREAD MESSAGES — 1010

*FIG. 10*

RECOMMENDATION AND SUMMARIZATION OF UNREAD MESSAGES

FIELD

The present application generally relates to online chat channels and more specifically relates to recommending and summarizing unread messages.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 10 shows an example method for recommending and summarizing unread messages;

DETAILED DESCRIPTION

Figure 1:
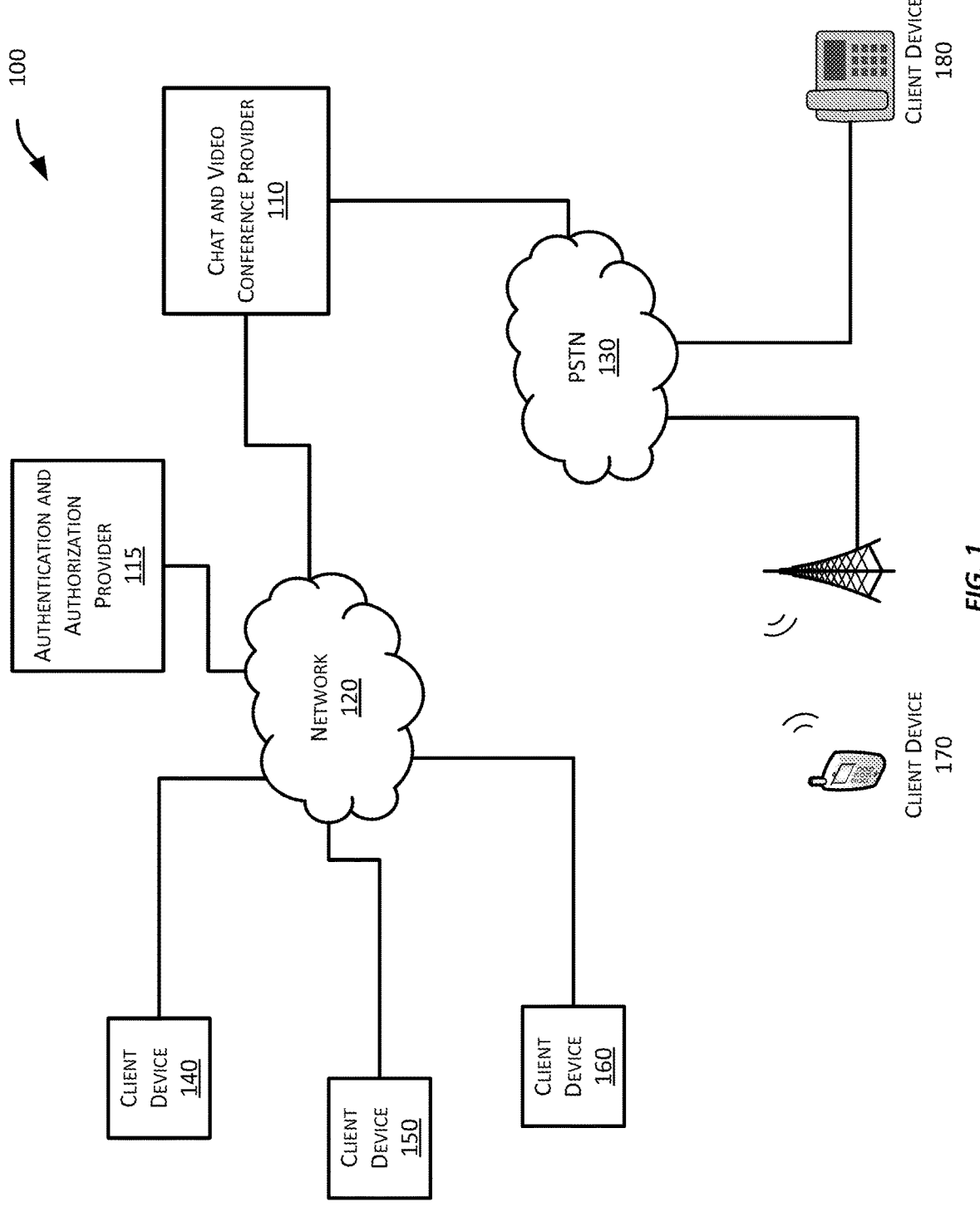
FIG. 1 shows an example system that provides videoconferencing and chat functionality to various client devices.

Examples are described herein in the context of recommending and summarizing unread messages. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Users are often overloaded with unread messages, such as unread chat messages in chat applications, unread emails in inboxes, unread feeds in social media accounts, or any other unconsumed data from online user accounts. Some important information may be buried in the unread messages. Users may not have time to read all the unread messages. If a user does not check all the unread messages, the user may miss the important information.

To capture important and relevant unread messages for a user, the present disclosure provides techniques for recommending and summarizing unread messages based on derived user features from historical messages and user metadata. The user metadata can include user profile data, such as title, team, location, chat channels, chat contacts, and any information included in the user profile on an online chat platform. The user metadata also includes user activity data, for example user actions associated with the chat messages and user interactions with other users on the online chat platform.

For example, a user has unread messages on an online chat platform. The unread messages may be from different contacts, different threads, or different channels. A recommendation engine can be configured to recommend relevant unread messages. Similarly, a summarization engine can be configured to summarize relevant unread messages. The recommendation engine and the summarization engine can be part of an external application to the online chat platform or internal modules on the online chat platform. A user can permit the recommendation engine and/or the summarization engine to access some or all unread messages for processing. For example, the user permits the recommendation engine to process unread messages in a particular chat channel. The recommendation engine can recommend one or more unread messages among all the unread and accessible messages to a user at a predetermined interval (e.g., hourly, daily, weekly) based on user setting or per the user's ad hoc request.

In some examples, the recommendation engine 360 implements an artificial intelligence or machine learning (AI/ML) model, such as collaborative filtering or any suitable AI/ML techniques, for generating recommendations. During a training phase, user data is collected and processed to derive and weigh user features. The user data can include user chat data (e.g., historical chat messages) and user metadata (e.g., profile data, activity data). The derived features can include content that is important or interesting to the user and contacts the user interacts with frequently. The AI/ML model can be trained to rank unread messages based on relevancy to the derived and weighted user features.

The trained AI/ML model can rank unread messages and provide a recommended list of unread messages to the user. In some examples, the recommendation engine transmits the recommended list as a notification message in the GUI of the particular chat channel that includes a number of unread messages. In some examples, the notification message is displayed in a designated GUI of the chat platform. The notification message may include the content of or the links to the recommended unread messages. The notification message may also include a request for feedback regarding relevancy of the recommended unready messages. This feedback can be used to update the AI/ML model in the recommendation engine.

Alternative, or additionally, a summarization engine can be configured to generate a summary of unread messages. In some examples, the summarization engine implements an AI/ML model, such as supervised learning or any suitable AI/ML techniques, for summarizing unread messages. Similar to training the AI/ML model in the recommendation engine, during a training phase, user data is collected and processed to derive and weigh user features, such as content types that are important or interesting to the user and contacts that the user interacts with frequently. The summarization engine can be trained to summarize unread messages that are relevant to the derived user features. The summarization engine can be implemented independent of the recommendation engine. In some examples, the summarization engine provides a summary for the recommended list of unread messages provided by the recommendation engine. In some examples, the summarization engine processes some or all the unread messages to generate a summary of unread messages as specified by a user.

Thus, this example provides a recommendation and summarization of unread messages for a user. The recommendation includes a culled list of unread messages that are relevant and important to the user. It saves the user's time, and the user can quickly access the relevant and important messages without going through all the unread messages. Meanwhile, a summary of the unread messages can further save time for the user. The user does not even need to read individual recommended messages, but a short summary including the gist of the recommended messages or all the unread messages.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
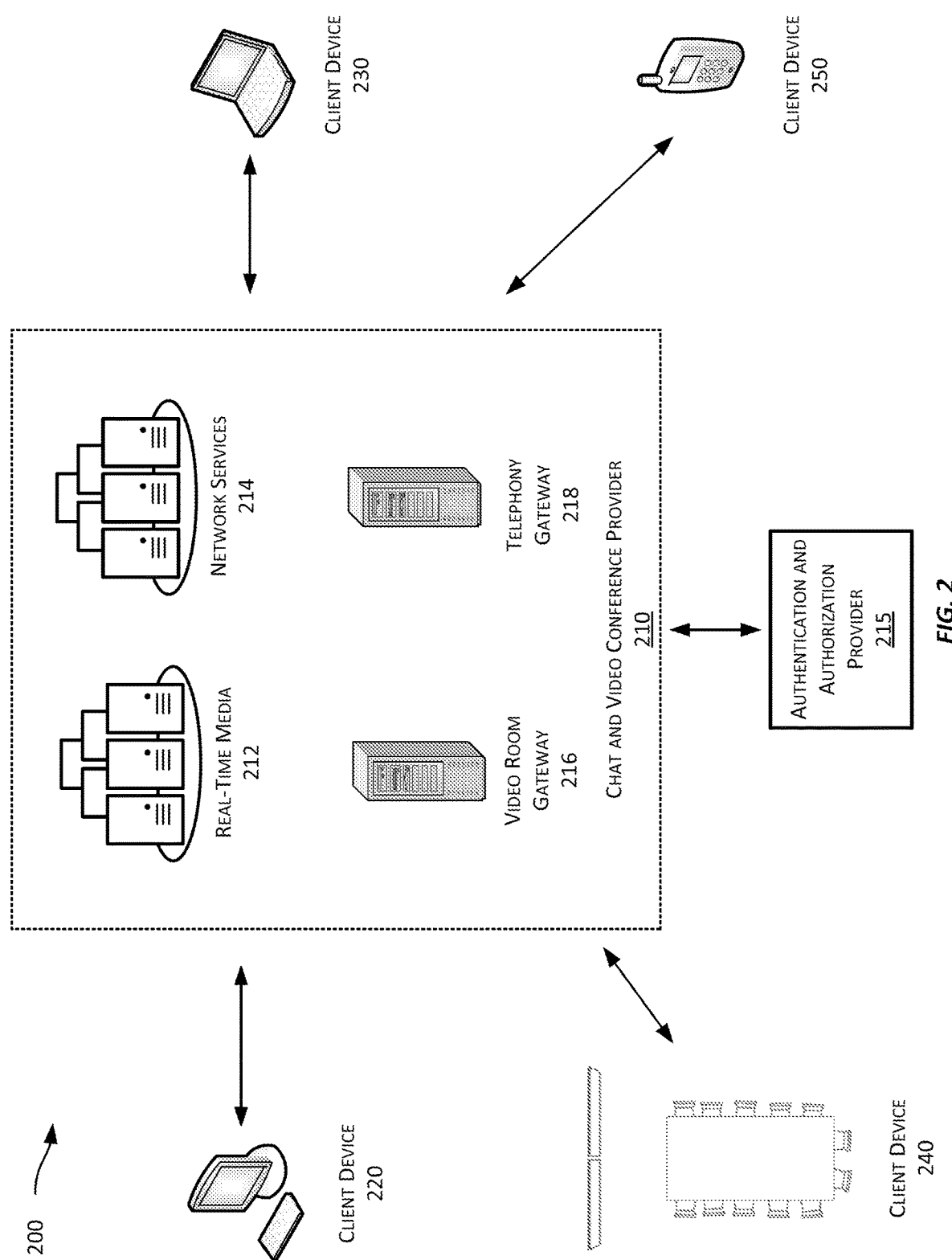
FIG. 2 shows an example system in which a chat and video conference provider provides videoconferencing and chat functionality to various client device.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it.

Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
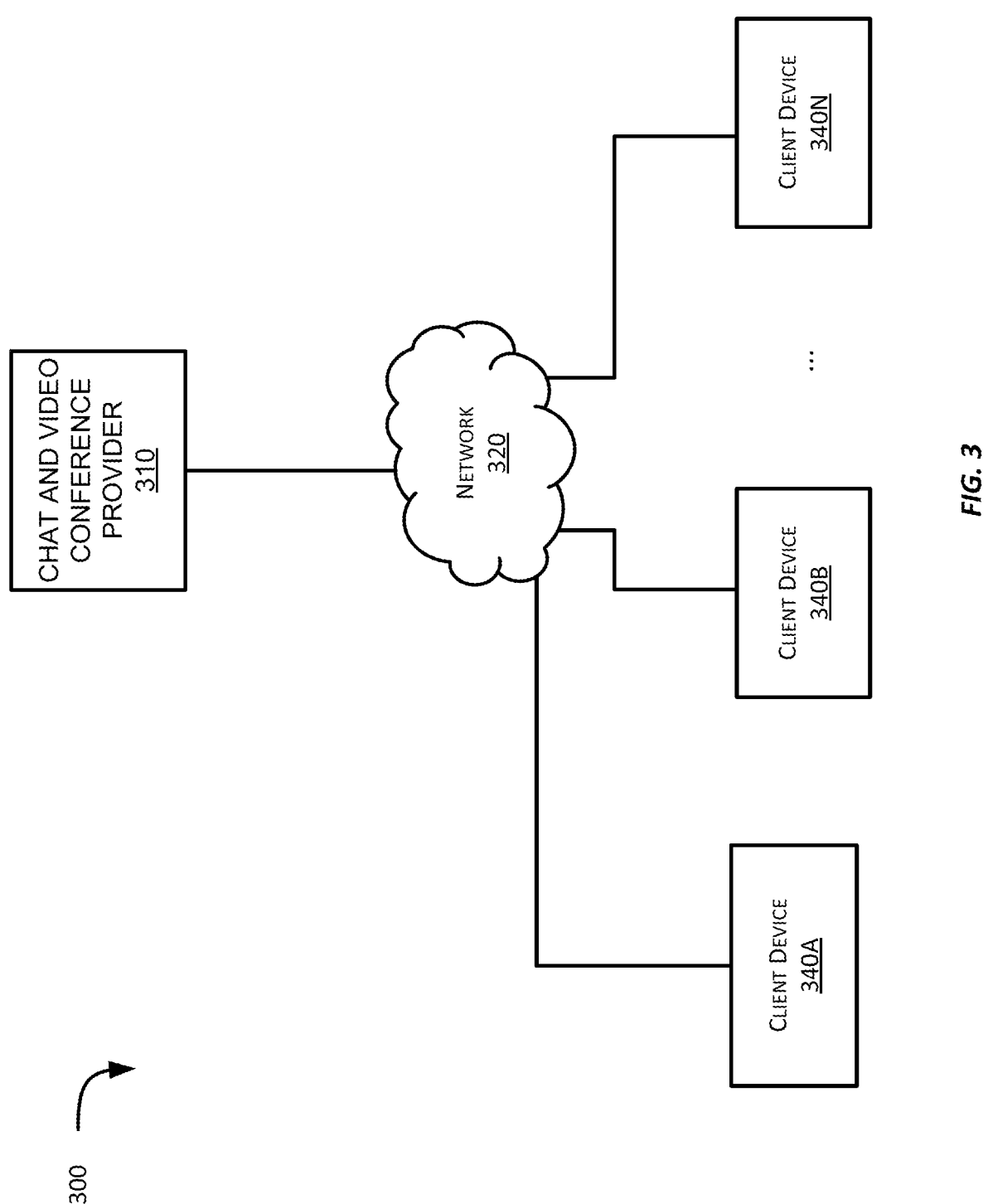
FIG. 3 shows an example system that recommends and summarizes unread messages.

Referring now to FIG. 3, FIG. 3 shows an example system 300 that recommends and summarizes unread chat messages. In this example system 300, a chat and video conference provider 310 and a number of client device 340A-340N (which may be referred to herein individually as a client device 340 or collectively as the client devices 340) are connected via a network 320. The chat and video conference provider 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the chat and video conference provider 310 using the internet or other suitable computer network. The client devices 340 have chat and video conference software installed to enable them to connect to the chat and video conference provider 310. During a chat session, a user associated a client device (e.g., client device 340A) can interact with other users associated with other client devices (e.g., client device 340B-340N) via the chat and video conference provider 310 by sending and receiving chat messages, and reacting to received chat messages.

Figure 4:
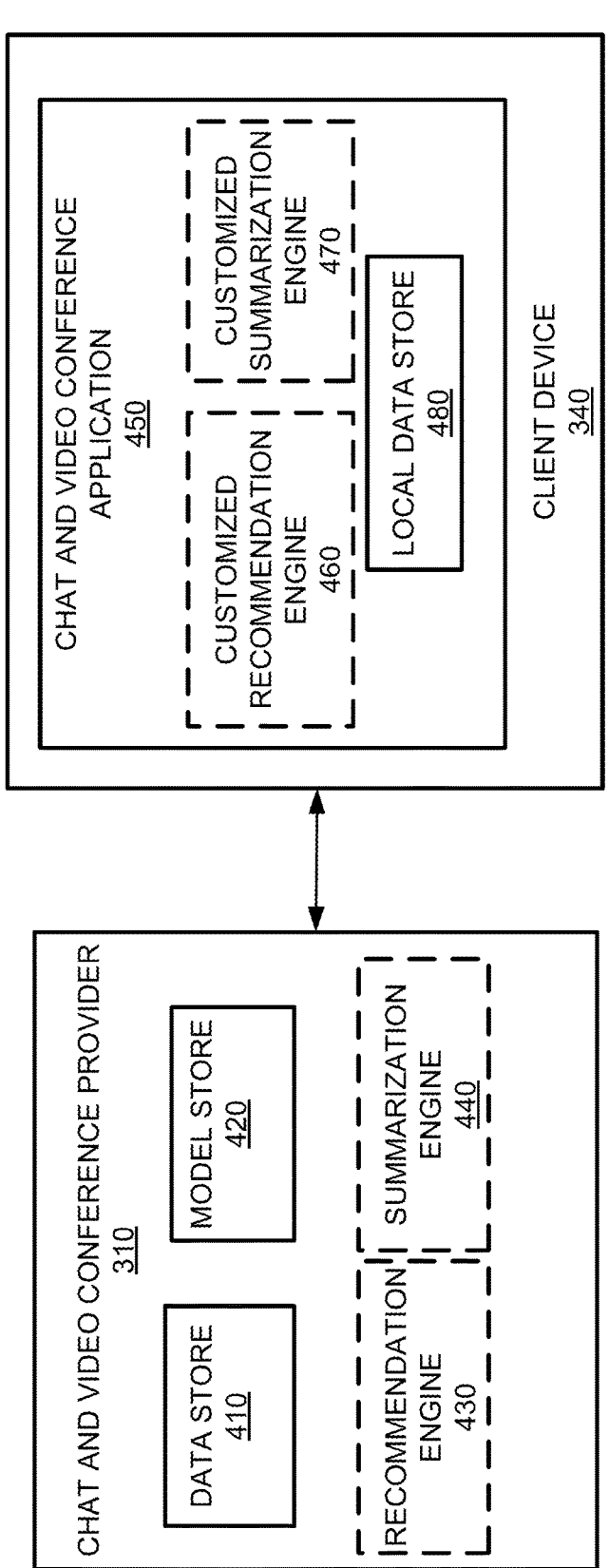
FIG. 4 shows an example system that is configured to recommend and summarize unread messages.

Now referring to FIG. 4, FIG. 4 shows an example system 400 that is configured to recommend and summarize unread messages. The chat and video conference provider 310 is in network communication with a client device 340. The client device 340 is installed with a chat and video conference application 450 provided by the chat and video conference provider 310.

The chat and video conference provider 310 includes a data store 410 and a model store 420. The data store 410 stores historical chat data from different client devices 340. The historical chat data can include message identifications, channel identifications, parent message identification (if any), sender identification, message content, send time, reply to the message (if any), and reply time (if any). The data store 410 can also store user metadata. The user metadata includes user profile data, for example, title, team, location, chat channels, chat contacts, and any information included in the user profile on the chat and video conference platform. The user metadata also includes user activity data, for example, user actions associated with historical chat data and user interactions with other users on the chat and video conference platform. The user actions associated with historical chat data includes if the user read the chat messages or did not read the chat message, or if the user responded or did not respond to the chat message. The user interactions with other users via the chat and video conference provider 310 can include how often a user interacts with different channels and contacts.

The model store 420 includes different AI/ML models for recommending and summarizing unread messages. Various types of models or artificial intelligence algorithms may be used in example systems. For example, simple machine learning models, such as Linear Regression and Gradient Boosting may be used. In other examples, more sophisticated models, such as Factorization Machines ("FM"). As more data is available in a system according to these examples, deep learning models may be utilized, such as Deep FM and Wide&Deep or other similar models. Other alternative machine-learning models that might be used include a deep convolutional neural network ("CNN"), a residual neural network ("Resnet"), or a recurrent neural network, e.g., long short-term memory ("LSTM") models or gated recurrent units ("GRUs") models. The machine-learning model can also be any other suitable machine-learning model, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine-learning models, such as AEGANs or variational AEGANs ("VAE-GANs"). Alternatively, some machine-learning models may use transformer networks or self-attention based neural networks. In addition, the models or artificial intelligence algorithms in the model store can be supervised or unsupervised learning models.

In some examples, the chat and video conference provider 310 is configured to select an ML model from the model store 420 and train the ML model for recommending unread messages for a specific user or user group. The chat and video conference provider 310 can generate different user groups based on the user profile data stored in the data store 410. During the training phase, the chat and video conference provider 310 can aggregate the chat data and user metadata from the data store 410 to derive user features. The derived user features can include types of chat content with an importance or interest score to the user or user group and types of contacts with certain interaction frequency. The importance or interest scores and the interaction frequencies can be considered as weights for the derived user features in ranking and recommending unread messages. Similarly, the chat and video conference provider 310 can train multiple ML models for recommendation for multiple users or user groups. The model store 420 can also store the multiple trained ML models for recommendation.

In some examples, the chat and video conference provider 310 includes a recommendation engine 430 configured to generate recommendations of unread messages. The recommendation engine 430 may implement an ML model that is not tailored to any specific user but apply to various users. In some examples, the recommendation engine 430 implements a trained ML model for recommendation stored in the model store 420 corresponding to the user group that the user belongs to. Alternatively, the recommendation engine 430 can include the multiple trained ML models for recommendation from the model store 420 and select one trained model based on the user group of the user for recommendation. Even though in this example an ML model is used in for recommending unread messages, the recommendation engine 430 is not limited to using an ML model for generating recommendations of unread messages. The recommendation engine 430 can implement any suitable models or algorithms.

In some examples, the chat and video conference provider 310 selects a trained ML model for recommendation to be initially implemented by a recommendation engine in the chat and video conference application 450 of the client device 340. For example, the chat and video conference provider 310 can determine a user group for the user associated with the client device 340 based on user profile data. The chat and video conference provider 310 then transmits a trained ML model for recommendation corresponding to the user group to the chat and video conference application 450 installed on the client device 340. The chat and video conference application 450 can implement the trained ML model for recommendation corresponding to the user group as an initial recommendation engine. The initial recommendation engine can be retrained and customized as more user data associated with the client device 340 is collected, which will be described below as a customized recommendation engine 460.

In some examples, the chat and video conference provider 310 is configured to select a second ML model from the model store 420 and training the second ML model for summarizing certain unread messages. The chat and video conference provider 310 can extract key phrases for training the ML model for summarization based on the derived user features with their weights obtained from training the ML model for recommendations. Alternatively, the ML model for summarization is independent of the ML model for recommendation. When training the ML model for summarization, the chat and video conference provider 310 can derive user features and corresponding weights, such as types of chat content with an importance score and types of contact with certain interaction frequency for the user or user group, to extract key phrases for summarization. In some examples, the chat and video conference provider 310 trains the ML model for summarization to summarize using message sentences including the extracted key phrases. In some examples, the chat and video conference provider 310 trains the ML model for summarization to abstract and synthesize the unread messages based on the derived user features with their weights. Similarly, the chat and video conference provider 310 can train multiple ML models for summarization for multiple users or user groups. The model store 420 can also store the multiple trained ML models for summarization.

In some examples, the chat and video conference provider 310 includes a summarization engine 440 configured to generate a summary of unread messages for a user associated with a client device 340. The summarization engine 440 may not be tailored to any specific user but apply to various users. In some examples, the summarization engine 440 implements a trained ML model for summarization stored in the model store 420 corresponding to the user group that the user belongs to. Alternatively, the summarization engine 440 can include the multiple trained ML models for summarization from the model store 420 and select one trained model based on the user group of the user for summarization. Even though in this example an ML model is used in for summarizing unread messages, the summarization engine 440 is not limited to using an ML model for summarizing unread messages. The summarization engine 440 can implement any suitable models or algorithms for summarization.

In some examples, the chat and video conference provider 310 selects a trained ML model for summarization to be initially implemented by a summarization engine in the chat and video conference application 450 of the client device 340. For example, the chat and video conference provider 310 can determine a user group for the user associated with the client device 340 based on user profile data. The chat and video conference provider 310 then transmit a trained ML model for summarization corresponding to the user group to the chat and video conference application 350 installed on the client device 340. The chat and video conference application 450 can implement the trained ML model for summarization corresponding to the user group as an initial summarization engine. The initial summarization engine can be retrained and customized as user data associated with the client device 340 is collected, which will be described below as a customized summarization engine 470 below.

In some examples, the chat and video conference application 450 installed on the client device 340 includes a customized recommendation engine 460, a customized summarization engine 470, and a local data store 480. The local data store 480 stores chat data and user metadata for the user associated with the client device 340. The local data store 480 also stores feedback input from the user regarding the generated recommendations and summaries of unread messages.

The customized recommendation engine 460 is configured to recommend unread messages for the user associated with the client device 340, for example by using collaborative filtering techniques. In some examples, the recommendation engine 360 initially implements a trained ML model for recommendation from the chat and video conference provider 310. The chat and video conference provider 310 can determine a user group for the user associated with the client device 340 and transmit the trained ML model for recommendation for the corresponding user group to the client device 340 to be implemented in the customized recommendation engine 460. The trained ML model for recommendation was trained by the chat and video conference provider 310 with chat data and user metadata from other users, especially users similar to the particular user associated with the client device 340. For example, the ML model for recommendation can be trained by chat data and user metadata for users from the same department within a company. The users from the same department within the company may get the same trained ML model for recommendation initially.

When the chat and video conference application 450 is just installed on the client device 340, few data for the user associated with the client device 340 is collected or stored at the local data store 480. As more chat data, user metadata, and feedback input from the user associated with client device 340 is collected, the ML model implemented in the customized recommendation engine 460 can learn and tune user specific features more accurately to recommend more relevant unread messages to the user. Even though in this example an ML model is used in for recommending unread messages, the customized recommendation engine 460 is not limited to using an ML model for generating recommendations of unread messages. The customized recommendation engine 460 can implement any suitable models or algorithms.

The customized summarization engine 470 is configured to generate a summary for certain unread messages for the user associated with the client device 340. In some examples, the customized summarization engine 470 initially implements a trained ML model for summarization from the chat and video conference provider 310 for summarizing unread messages. The chat and video conference provider 310 can determine a user group for the user associated with the client device 340 and transmit the trained ML model for summarization for the corresponding user group to the client device 340 to be implemented in the customized summarization engine 470. The trained ML model for summarization was trained by the chat and video conference provider 310 with chat data and user metadata from other users, especially users similar to the particular user associated with the client device 340. For example, the ML model for summarization can be trained by chat data and user metadata for users from the same department within a company. The users from the same department within the company may get the same trained ML model for summarization initially.

When the chat and video conference application 450 is just installed on the client device 340, few data for the user associated with the client device 340 is collected or stored at the local data store 480. As more chat data, user metadata, and feedback input associated with the user is collected, the ML model implemented in the customized summarization engine 470 can learn and tune user specific features more accurately to summarize more relevant unread messages in the user preferred way. Even though in this example an ML model is used in for summarizing unread messages, the customized summarization engine 470 is not limited to using an ML model for summarizing unread messages. The customized summarization engine 470 can implement any suitable models or algorithms for summarization.

In some examples, the customized recommendation engine 460 and the customized summarization engine 470 are part of an external application integrated into the chat and video conference application 450. The external application can be provided by the chat and video conference provider 310. Alternatively, the external application can be provided by a third-party provider.

Figure 5:
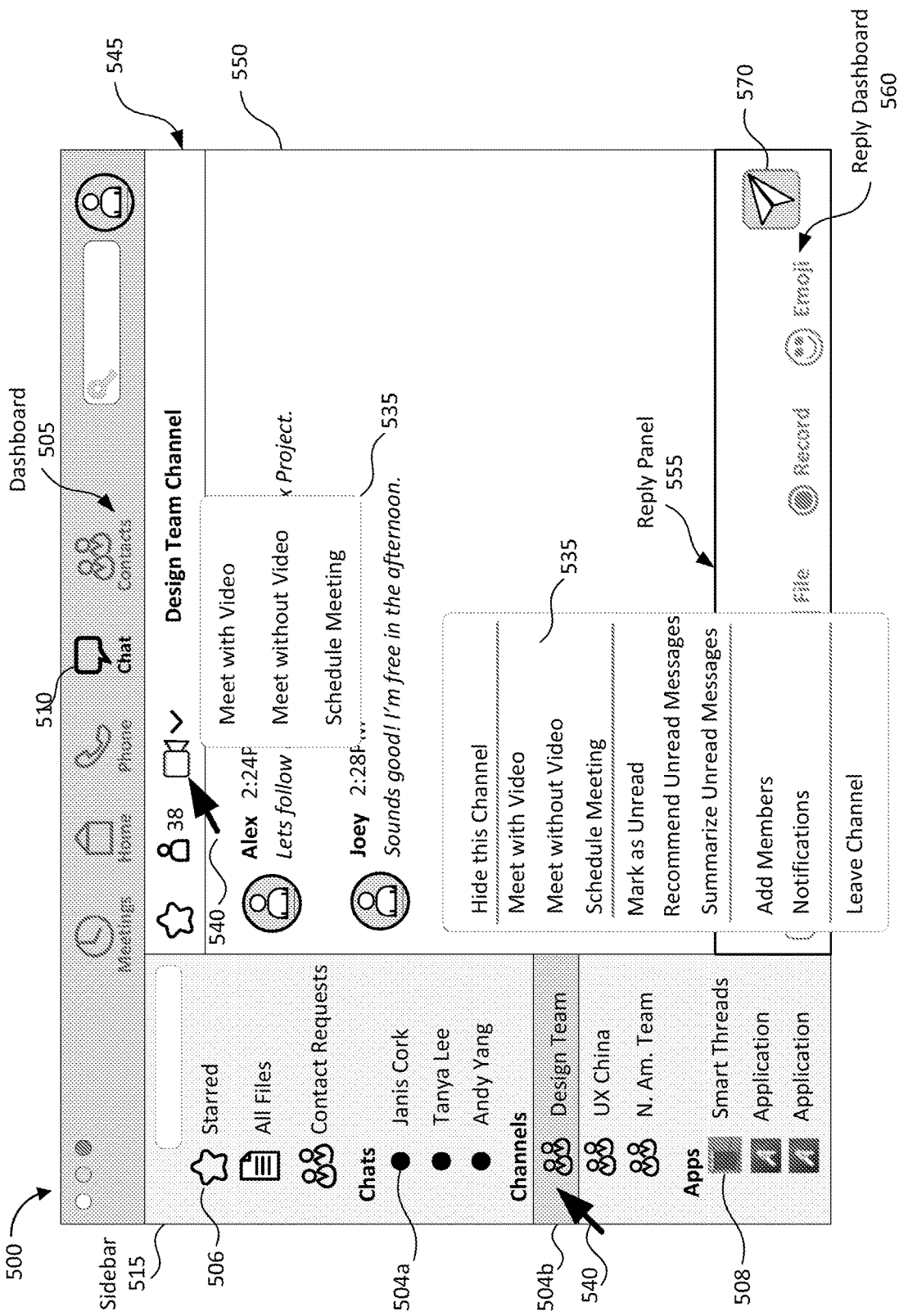
FIG. 5 shows an example master chat panel.

Now referring to FIG. 5, FIG. 5 shows an example master chat panel 500. The master chat panel 500 may be displayed on a client device 340 in response to information sent by a chat and video conference provider, such as the chat and video conference provider 310 in FIG. 4. The master chat panel 500 may be generated by a chat application run by one or more processors stored on the client device 340. In some examples, the application is a standalone chat client. In some examples, the application is integrated into a video conferencing application, such as a chat and video conference application 450 in FIG. 4. The client device 340 may be a personal computer such as a desktop or laptop, a mobile device, or other computing device having at least a processor, non-transitory memory, a user input system, and communication interface, providing network connectivity.

The master chat panel 500 may include a general dashboard 505, a chat control dashboard 545, a sidebar 515, a chat window 550, a reply dashboard 560, and a reply panel 555. The general dashboard 505 may include one or more buttons or links that switch functionalities and/or views of the master chat panel 500. For example, FIG. 5 shows a chat view, perhaps in response to a user command selecting a chat button 510 in the general dashboard 505. In this view, the chat window 550, the reply panel 555, and other components illustrated in FIG. 5 may be displayed on the client device 340. In other examples, a contacts button may be selected by a user. In response the contacts button being selected, the chat window 550, the reply dashboard 560 and the reply panel 555 may be replaced by a display of a contacts window including a list of user contacts associated with the user of the client device. The sidebar 515 may be displayed alongside the contacts window. Other configurations are also possible. Various buttons on the general dashboard 505 may correspond to various displays of windows being displayed on the client device 340. Any number of components shown in FIG. 5 may be displayed on the client device 340 with any of the various windows. Similarly, any of the components may cease to be displayed in accordance with any of the windows.

The sidebar 515 may include one or more chat channel headings. A chat heading may include one or more chat channels such as the chat channel 504*a* and chat channel 504*b*. In some examples, the chat channel may include a private chat 504*a*, where the chat is between the user associated with the client device 340 and another user. Messages sent and received via the chat channel 504*a* may only be accessed by the users in the chat channel 504*a*. Thus, the client devices 340 associated with the user and the client device 340 associated with the other user may securely communicate with each other. In some examples, the chat channel may by a group chat 504*b*, where two or more users have access to send and receive messages within the chat channel. In some examples, the chat channel 504*b* may only be accessed by users who have permission to enter the chat channel. A host of the chat channel 504*b* and/or the chat and video conference provider 310 may grant access to the chat channel 504*b*. Although only the chat channel headings including chat channels 504*a-b* are shown, other chat channel headings are possible. For example, some examples may include a chat channel heading that displays, on the client device 340, only those channels that the user associated with the client device 340 is a member of that have been recently accessed. "Recently accessed" may be determined by the client device 340 to be a fixed number of most recent channels accessed by the user, or may be only those channels access within a certain time, calculated from the current time.

The sidebar 515 may include an application heading. The application heading may include one or more independent applications integrated into the chat application (e.g., chat and video conference application 450). The independent applications can be provided by the chat and video conference provider 310 as microservices. Alternatively, or additionally, the independent applications can be provided by a third-party provider. In some examples, the one or more independent applications include a smart threads application 408 configured to recommend and summarize unread messages, for example using the customized recommendation engine 460 and the customized summarization engine 470 as described in FIG. 3.

The sidebar 415 may also include one or more combinatory headings, such as starred combinatory heading 506. A combinatory heading may aggregate one or more messages from one or more chat channels, according to a predetermined criterion. The combinatory headings may include a link that, in response to a user command, cause the client device to display one or more messages in the chat window 550. The messages may be gathered from one or more chat channels, such as the chat channel 504*a* and 504*b*, and displayed based on predetermined criteria. In FIG. 5, for example, the starred combinatory heading 506 may gather those messages that have been marked by a user of the client device 340. The marked messages may be stored at the client device 340, and/or may be stored at the chat and video conference provider 310. The marked messages in the starred combinatory heading 506 may also be unread messages gathered from some of all the chat channels. The marked messages in the starred combinatory heading 506 may also be recommended unread messages selected from the unread messages from some or all the chat channels. The marked messages in the starred combinatory heading 506 may also be summaries of recommended unread messages. The link may cause the one or more processors included on the client device 340 to determine which messages are marked messages and cause them to be displayed in the chat window 550. In some examples, the link may cause the client device 340 to send a signal to the chat and video conference provider 310. The chat and video conference provider 310 may then determine which messages are marked messages and send information to the client device 340 to generate a display of the marked messages in the chat window 550.

Other combinatory headings (and associated links and functionality) are also considered. Other examples may include an unread heading, a recommended unread messages heading, a summary of unread messages heading, an all files heading, a contact request heading, and others. As with the starred combinatory heading 506, an associated link may cause the client device 340 and/or the chat and video conference provider 310 to determine which messages (if any) meet predetermined criteria associated with the combinatory heading and subsequently display those messages on the client device 340.

The chat control dashboard 545 may display one or more control buttons and/or information regarding the chat channel currently being displayed on the client device. The control buttons may include links that mark a message (e.g., to mark it such that it is determined to be a marked message via the starred combinatory heading 506), begin a video conference, schedule a meeting, create a video message, or other tasks. The chat control dashboard may also include a title of the chat channel currently being displayed on the client device and/or a number of users with access to the chat channel. One of ordinary skill in the art would recognize many different possibilities and configurations.

The reply panel 555 may include an input field, where the user may cause the client device 340 to send a message to the chat channel. The input field may be accessed by a peripheral device such as a mouse, a keyboard, a stylus, or any other suitable input method. In some examples, the input field may be accessed by a touchscreen or other system built into the client device. In some examples, a notification may be sent from the client device 340 and/or the video conference provider 310 that indicates a response is being entered into the input field by the user. In other examples, no notification may be sent.

The reply dashboard 560 may include one or more buttons that, in response to a user command edit or modify a response input into the input field. For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 560. The one or more formatting buttons may change the appearance of a replay entered in the input field. The user may thereby edit and customize their response in the input field before sending.

The reply dashboard 560 may include a send button 570. The send button 570 may, in response to a user command, cause the client device 340 to send the contents of the input field (or "response") to the chat channel. The client device 340 may then send the response to the chat and video conference provider 310. The chat and video conference provider 310 may then send the response to the chat channel, which publishes the response for the users in the channel. The response may include image files such as JPEG, PNG, TIFF, or files in any other suitable format. The response may also include video files such as MPEG, GIF, or video files in any other suitable format. The response may also include text entered into the input field and/or other files attached to the message such as a PDF, DOC, or other file format.

The master chat panel 500 may include menus 535. The menu 535 may include one or more buttons, which add functionality to the messages in the chat channels and/or the chat channels themselves. The menu 535 may be displayed in response to a user request on the client device. In the illustrated example, the user may have requested the menu 535 associated with a design team chat channel 504*b*. The user may have requested the menu 535 from the client device using the cursor 540. In some examples, mousing over a channel may cause the menu 535 to be displayed. In other examples, the menu 435 may be displayed in response to another user input (e.g., a right-click on the mouse while hovering over the design team chat channel 504). In other examples, the menu 535 may be displayed by a user input occurring in another space rather than the design team chat channel 504. For example, the menu 435 may be brought up by an input in a blank space of a chat window 550. One of ordinary skill in the art would recognize many different possibilities.

The menu 535 may include options associated with a chat channel. Those options may include starting a video conference (or "meeting"), scheduling a meeting, adding or removing members from the chat channel, changing setting associated with notifications sent to the client device, no longer displaying the chat channel in sidebar 415, recording a video message, and other such options. In some examples, the menu 535 may include options for a specific chat within the chat channel. For example, the menu 535 may include an option to mark a message as unread. As another example, the menu 535 may include an option to recommend unread messages and an option to summarize unread messages.

Although the menu 535 is illustrated as being opened from the design team chat channel 504*b* on the sidebar 515, the menu 535 may be opened from elsewhere. The menu 535 may display the same functions or different functions depending on where it is opened. For example, there may be a button on the chat control dashboard 545 that causes the client device to open the menu 535. Opening the menu 535 from the chat control dashboard 545 may only display functions related to a video meeting, for example. Functions related to a specific message in the chat may only be displayed in the menu 535 if the client device receives a user input on the specific message.

Figure 6:
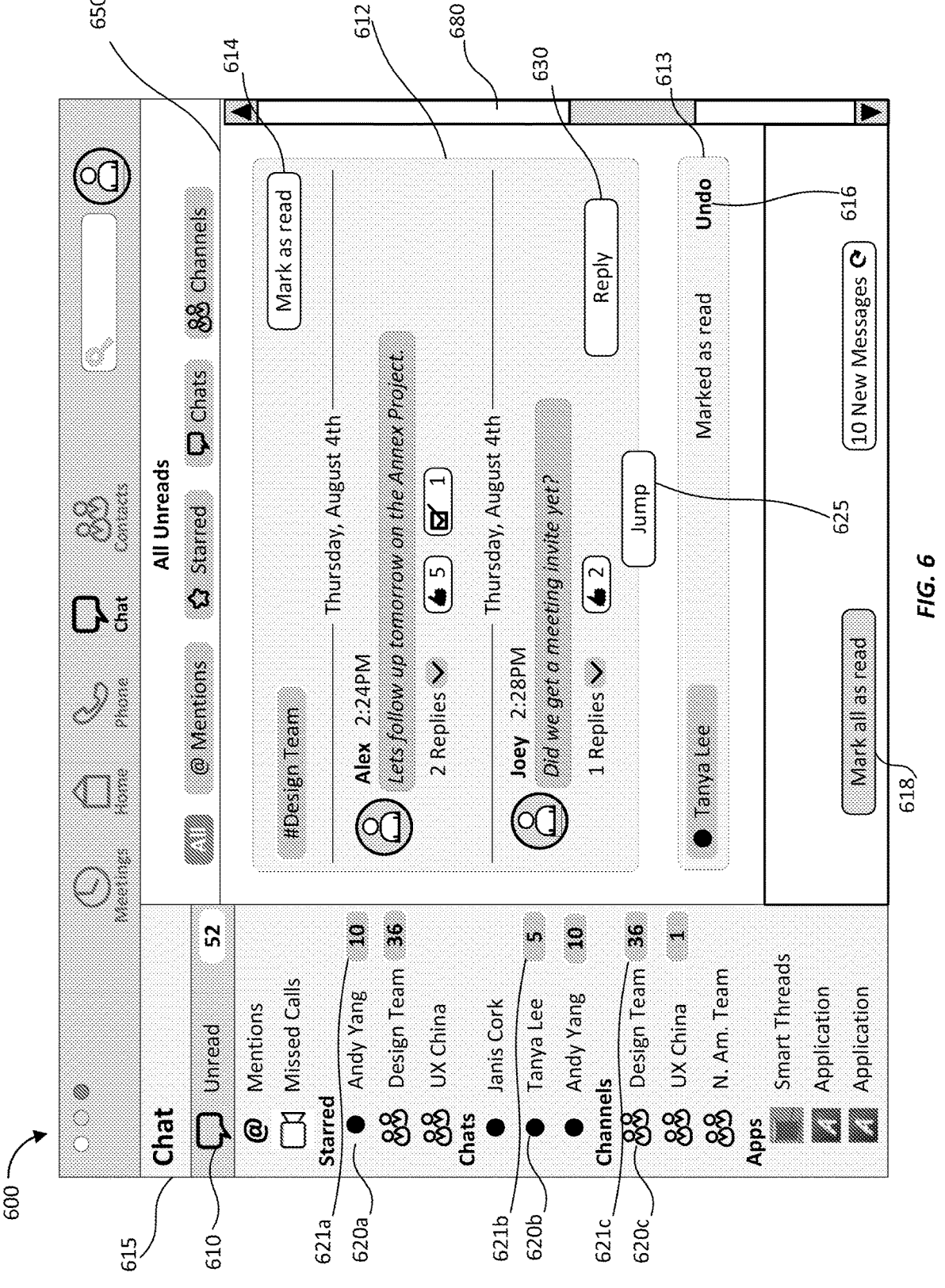
FIG. 6 shows an example master chat panel displaying an unread landing page.

Now referring to FIG. 6, FIG. 6 shows an example master chat panel 600 displaying an unread landing page 650. The master chat panel 600 may be similar to the master chat panel 500 and therefore have some or all of the same components and functionalities. The master chat panel 600 may include a sidebar 615 that further includes one or more combinatory headings (as described in FIG. 5) and chat channel buttons 620*a-c*. The chat channels associated with the chat channel buttons 620*a-c* may include chats between the user and one other participant or chat channels with two or more participants. The chat channel buttons 620*a-c* may be organized based on criteria such as number of participants in the associated channel, frequency of use by the user, a user-defined selection (e.g., a grouping of chat channels determined by a user choice), or any other appropriate method.

The chat channel buttons 620*a-c* may include links that, in response to a user input, cause the client device to display the associated chat channel in the master chat panel 600. For example, the chat channel button 620*a* may include a link that causes a chat channel associated with "Andy Yang" to be displayed in a chat window similar to the chat window 550 in FIG. 5. Similarly, the chat channel 620c may include a link that causes a chat channel associated with "Design Team" to be displayed in the chat window 550.

The chat channel buttons 620a-c may also include unread indicators 621a-c, respectively. The unread indicators 621a-c may display a number of unread messages within the chat channels associated with the chat channel buttons 620a-c. For example, as shown in FIG. 6, the unread indicator 621a for chat channel button 620a indicates that there are 10 unread messages in the associated chat channel. The unread indicator 621b for chat channel button 620b indicates that there are 5 unread messages in the associated chat channel, while the unread indicator 621c for chat channel 620c indicate that there are 36 unread messages in the associated chat channel.

The values shown in the unread indicators 621a-c may be changed by the client device 340. For example, the client device 340 may receive a new unread message via the chat channel associated with the chat channel button 620a from a chat and video conference provider 310. The unread indicator 621a for chat channel button 620a may then be updated by the client device 340 to indicate that there are 11 unread messages in the associated chat channel. Similarly, the unread indicators 621a-c for the chat channel buttons 620a-c may decrease if the user reads an unread message from an associated chat channel. In some embodiments, the client device 340 may update the unread indicators 621a-c associated with a chat channel button 520a-c in response to displaying the associated chat channel in the chat window 550, as discussed above. The number displayed by the unread indicators 621a-c may also be reduced by the client device 340 in response to a user command corresponding to one or more buttons included in the unread landing page 650, discussed in more detail below.

In some embodiments, the chat and video conference provider 310 track the individual status of each of the messages directed to the user. The chat and video conference provider 310 may have a record of a read status associated with each message directed to the user. The chat and video conference provider 310 may provide information about the messages such that the client device 340 display the unread indicators 621a-c accordingly.

The unread landing page 650 may be displayed on the client device 340 in response to a user input. The user input may correspond to an unread button 610. The unread button 610 may be included in a sidebar 615 and may be a combinatory heading, as described in relation to FIG. 5. In response to the user input corresponding to the unread button 610, the client device 340 may determine that one or more messages in one or more chat channels, directed to a user associated with the client device, are unread messages. The client device 340 may aggregate the unread messages from the one or more chat channels and display the unread messages on the unread landing page 650. In some embodiments, the chat and video conference provider 310 may aggregate the unread messages based on the record of the read status associated with each message. The chat and video conference provider 310 may then provide information to the client device 340 to generate and display the unread landing page 650.

The unread landing page 650 may display an unread message 612 and a message-read notification 613. As shown in FIG. 6, the unread message 612 may be received via the "Design Team" chat channel, whereas the message associated with the message-read notification 613 may be received via a chat with "Tanya Lee." Although the unread message 612 and message associated with the message-read notification 613 are shown from only two chat channels, the unread landing page may include any number of unread messages from any number of chat channels. For example, a message from the chat channel "Andy Yang" may be displayed on the unread landing page 650, although not shown in FIG. 6. Unseen messages may be displayed on the unread landing page 650 in response to a user input corresponding to a scroll bar 680. The scroll bar 680 may allow the user to view portions of the unread landing page 650 both above and below a current display.

The unread message 612 may include one or more messages from an associated chat channel. In some embodiments, one or more preceding messages from the chat channel associated with the unread message 612 may be displayed, even if the preceding messages have been read by the user. In this way, the user may be provided context for the unread message. The unread message 612 may include a date and time the message was received, a name of a participant that posted the unread message 612, an indication of replies to the message to the unread message 612, reactions to the unread message 612 by other participants, and other information associated with the message.

The unread message 612 may also include a jump button 625. In response to a user command associated with the jump button 625, the client device 340 may cause the chat channel associated with the unread message 612 (in FIG. 6, the "Design Team" chat channel) to be displayed in the chat window, with the unread message 612 itself displayed for the user to see in the chat channel. The client device 340 may then update the unread indicators 621c for the associated chat channel 620c. In some embodiments, the unread indicator 621c may display nothing, as all messages in the chat channel are read.

In some embodiments, the client device 340 may transmit a signal to the chat and video conference provider 310 including an update to one or more messages (e.g., that a message went from "unread" to "read."). The chat and video conference provider 310 may then send an updated status to the client device 340. The client device 340 may then remove the unread status of the message and remove the message from the unread landing page. Similarly, the chat and video conference provider 310 may send a signal that causes all messages in a chat channel to be marked as read and removed from the unread landing page 650. In both instances, the client device may then update the unread indicators 621a-c accordingly.

The unread message 612 may also include a mark-as-read button 6514. In response to a user command corresponding to the mark-as-read button 614, the client device may flag the unread message as read. The client device may then update the unread indicators 621a-c on the associated chat channel button 620a-c, reducing the number displayed by the number of chats included in the unread message 612.

The unread landing page 650 may also display a message-read notification 613. The client device 340 may generate the message-read notification 613 in response to an unread message being flagged as read. In the present example, the message-read notification 613 may be associated with an unread message from the chat channel associated with the chat channel button 620b. The unread message may have been previously displayed in the unread landing page 650, and may have been similar to the unread message 612, including an associated mark-as-read button similar to the mark-as-read button 614. The client device 340 may have flagged the unread message as read in response to a user input corresponding to the associated mark-as-read button.

The client device 340 may send an update signal to the chat and video conference provider 310, causing the record of the message to be updated accordingly. The client device 340 may then have generated the message-read notification 613 and displayed the message-read notification 613 in the unread landing page 650. In some embodiments, the client device 340 may generate the message-read notification 613 in response to a signal from the chat and video conference provider 310. The unread notification for the associated chat channel button 620*a-c* may then be updated accordingly by the client device 340. In some embodiments, the message-read notification 613 is displayed for a limited amount of time, such as 3 seconds. The message-read notification 613 may include an undo button 616. In response to a user input corresponding to the undo button 616, the associated message may be redisplayed on the unread landing page. The unread notification for the associated chat channel button 620*a-c* may then be updated accordingly by the client device.

The unread landing page 650 may include a mark-all-as-read button 618. In response to a user command corresponding to the mark-all-as-read button 618, the client device may flag all of the unread messages displayed in the unread landing page 650 as read. The client device may then generate a message-read notification similar to the message-read notification 613 for each of the unread messages in the unread landing page 650. The client device 340 may also update the unread notification for the associated chat channel button 620*a-c* accordingly.

The unread message 612 may also include a reply button 630. In response to a user command corresponding to the reply button 630, the client device 340 may generate a replay window (not shown), including an input field which allows the user to create a response message. In some embodiments, the reply button 630 may not be included in the unread message 612. The response window may be generated in response to a user input such as a mouse click on the unread message 612 or from a menu such as the menu 535 described in FIG. 5.

Figure 7:
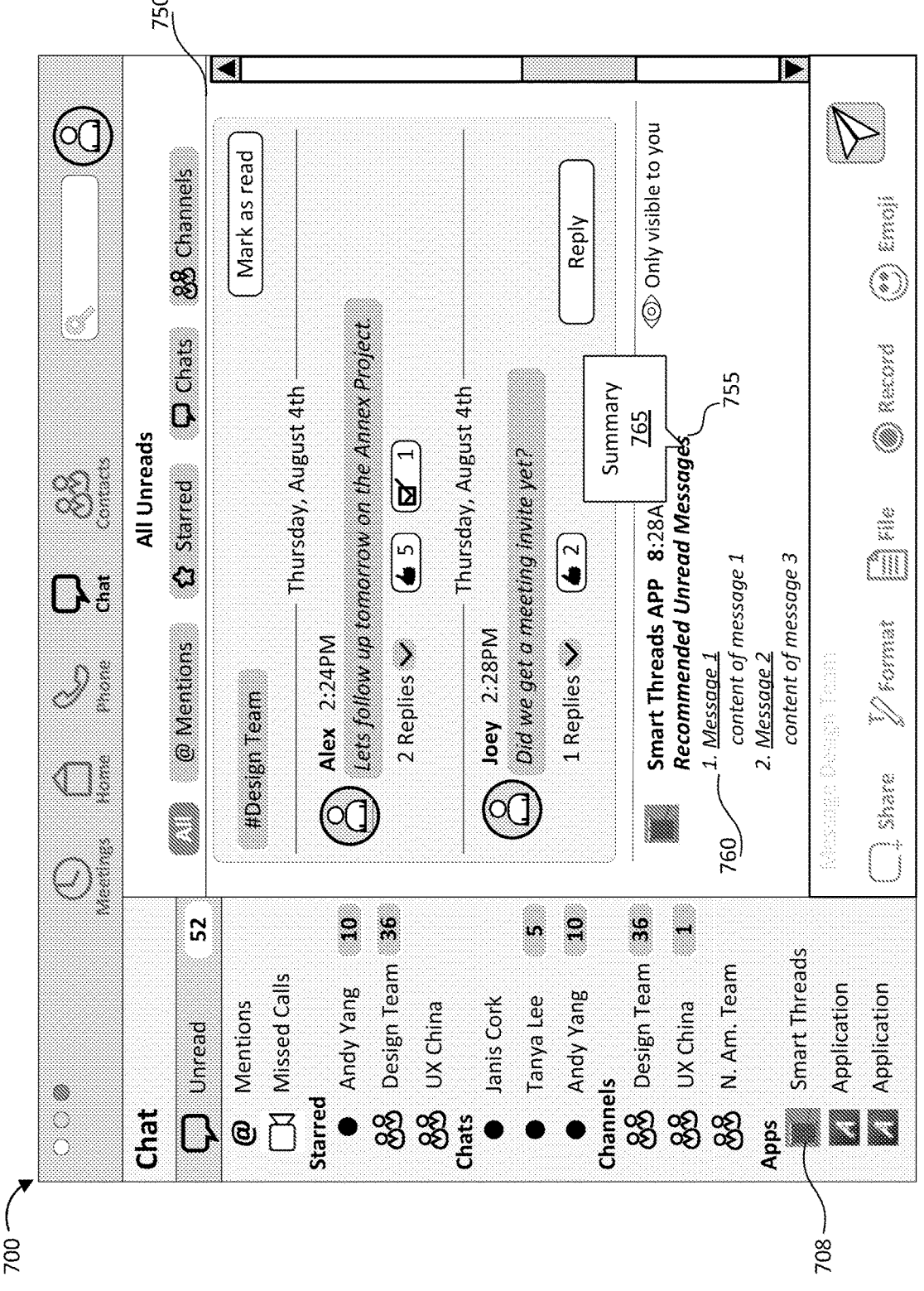
FIG. 7 shows an example master chat panel displaying a list of recommended unread messages and a summary of the recommended unread messages in the unread landing page.

Now referring to FIG. 7, FIG. 7 shows an example master chat panel 700 displaying a list of recommended unread messages 760 and a summary 765 of the recommended unread messages in the unread landing page 750. The master chat panel 700 may be similar to the master chat panel 600 in FIG. 6 and therefore include some or all of the components and functionalities included therein. Similarly, the unread landing page 750 may be similar to the unread landing page 650 and therefore include some or all of the components and functionalities included therein.

In this example, the unread landing page 750 includes a notification message 755. The notification message 755 is generated by the customized recommendation engine 460 of an external application as described in FIG. 4, for example the smart threads application 708. Alternatively, the notification message 755 can be generated by customized recommendation engine 460 of the chat and video conference application 450 or by the recommendation engine 430 of the chat and video conference provider 310. The notification message 755 is only visible to the user associated with the client device 340. The notification message 755 includes a list of recommended unread messages 760, such as "message 1," "message 2," and "message 3." In some examples, the items in the list of recommended unread messages 760, such as "message 1," "message 2," and "message 3," include links to the original unread messages in corresponding chat channels. In some examples, the content of some or all recommended unread messages can be displayed in the list of the recommended unread messages, such as the content of message 1. The content can be hidden by collapsing the corresponding message item (e.g., message 1 in the list of recommended unread message 760). The items in the list of recommended unread messages 660 can be organized by chat channels. Each chat channel included in the list of recommended unread messages 660 can be expanded to display recommended unread messages in corresponding chat channels. The notification message 755 can also include a summary 765 for the list of the recommended unread messages 760. The summary 765 can be displayed in a hover window when the cursor is at the list of the recommended unread messages 760. Alternatively, or additionally, the summary 765 can be included in the notification message 755, besides the list of recommended unread messages 760.

In some examples, the notification message 755 includes a summary for some of the recommended unread messages. For example, when the recommended unread messages are organized by chat channels, a summary can be displayed for each chat channel included in the notification message 755. The summary for each chat channel can be displayed in a hover window when the cursor is at the corresponding chat channel section in the notification message 755. Alternatively, or additionally, the summary for each chat channel can be displayed in the notification message 755 when a corresponding chat channel section is expanded in the notification message 755.

Figure 8:
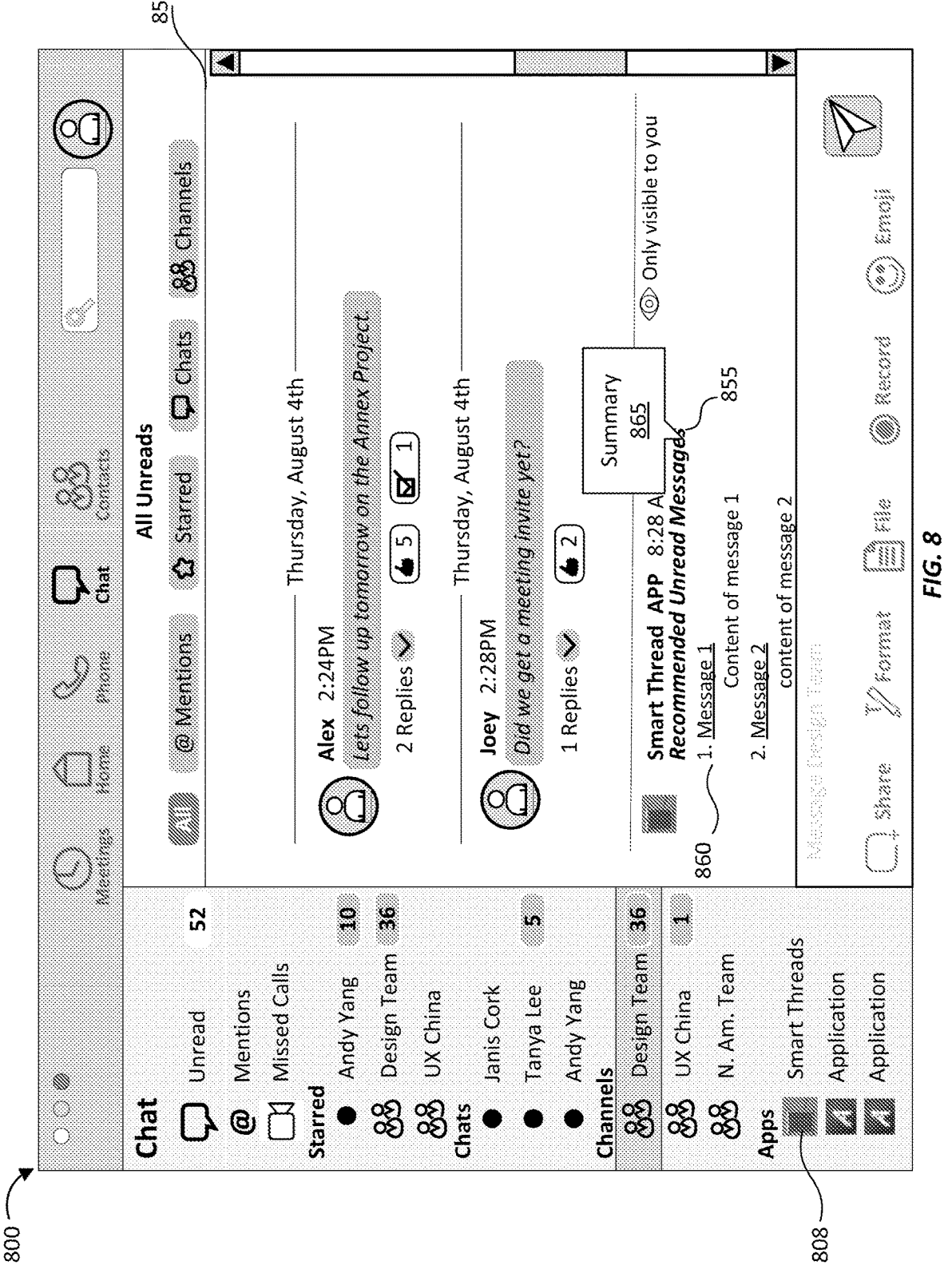
FIG. 8 shows an example master chat panel displaying a list of recommended unread messages and a summary of the recommended unread messages in the chat window of the design team chat channel.

Now referring to FIG. 8, FIG. 8 shows an example master chat panel 800 displaying a list of recommended unread messages 860 and a summary 865 of the recommended unread messages in the chat window 850 of the design team chat channel. The master chat panel 800 may be similar to the master chat panel 600 in FIG. 6 and therefore include some or all of the components and functionalities included therein. Similarly, the chat window 850 may be similar to the unread landing page 650 and therefore include some or all of the components and functionalities included therein. In this example, the chat window 850 of the design team channel includes a notification message 855. The notification message 855 is generated by the recommendation engine 430 of the chat and video conference provider 310, or by the customized recommendation engine 460 as described in FIG. 4 of the chat and video conference application 450 or an external application (e.g., smart threads application 808), and is only visible to the user associated with the client device 340. The notification message 855 includes a list of recommended unread messages 860, such as "message 1" and "message 2." In some examples, the items in the list of recommended unread messages 860, such as "message 1" and "message 2," include links to the original unread messages in the design team chat channel, allowing the user to jump directly to the messages at their respective positions within the chat channel. Alternatively, or additionally, the content of some or all recommended unread messages can be included in the list of recommended unread messages 860. The content of the recommended unread message may be displayed or hidden by expanding or collapsing corresponding message items (e.g., message 1 and message 2) in the list. The notification message 855 can also include a summary 865 for the list of the recommended unread messages 860. The summary 865 can be displayed in a hover window when the cursor is at the list of the recommended unread messages 860. Alternatively, or additionally, the summary 865 can be included in the notification message 755, besides the list of recommended unread messages 860.

Figure 9:
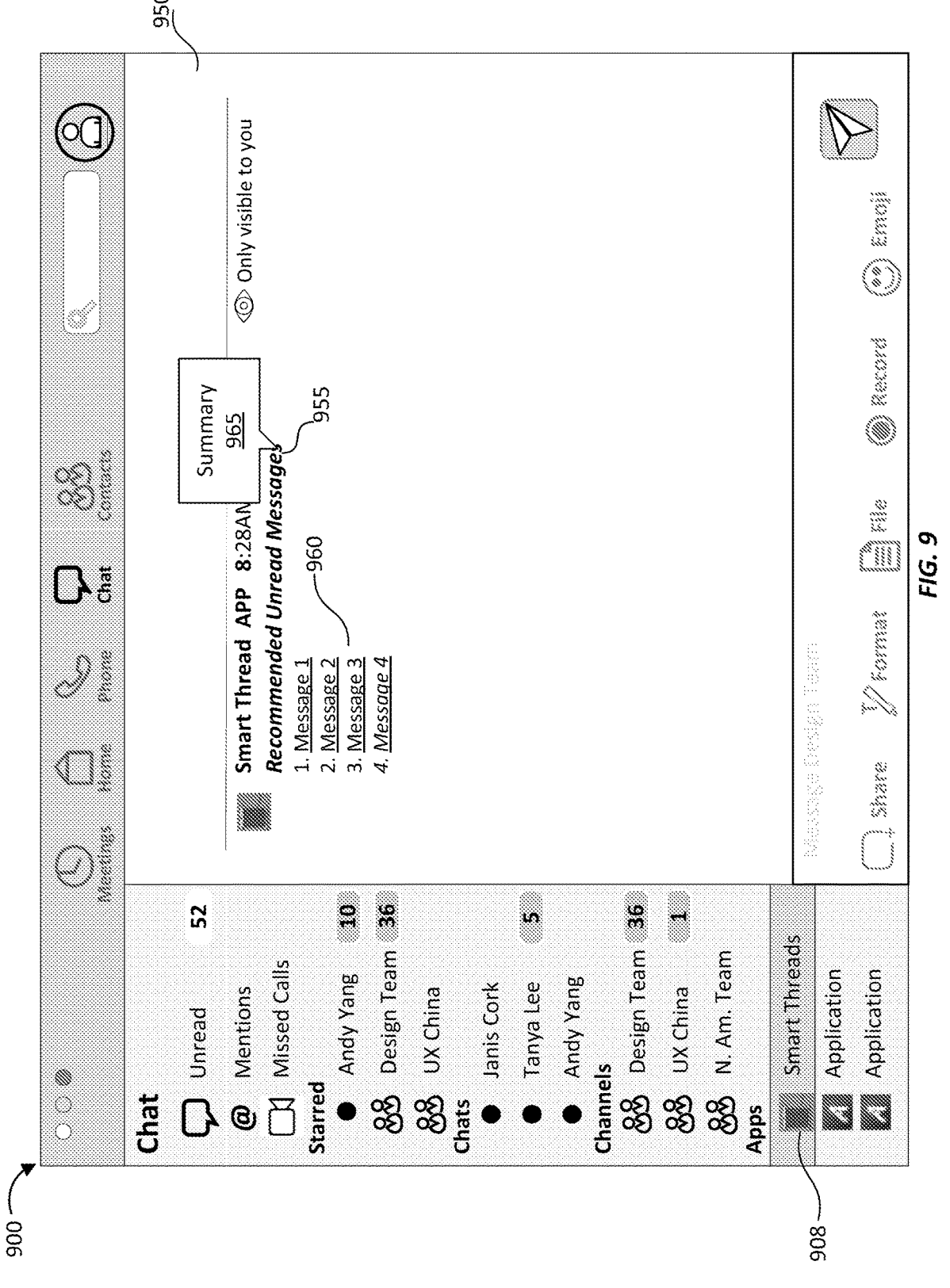
FIG. 9 shows an example master chat panel displaying a list of recommended unread messages and a summary of the recommended unread messages in an external application page.

Now referring to FIG. 9, FIG. 9 shows an example master chat panel 900 displaying a list of recommended unread messages 960 and a summary 965 of the recommended unread messages in an external application page 950. The master chat panel 900 may be similar to the master chat panel 600 in FIG. 6 and therefore include some or all of the components and functionalities included therein. In this example, the external application page 950 includes a notification message 955. The notification message 955 is generated by an external application (e.g., smart threads application 908), and is only visible to the user associated with the client device 340. The notification message 955 includes a list of recommended unread messages 960, such as "message 1," "message 2," "message 3," and "message 4." In some examples, the items in the list of recommended unread messages 960, such as "message 1," "message 2," "message 3," and "message 4," include links to the original unread messages in corresponding chat channels. In some examples, the items in the list of recommended unread messages 960 are organized by chat channels. Each chat channel included in the list of recommended unread messages 960 can be expanded to display recommended unread messages in corresponding chat channels. The notification message 955 can also include a summary 965 for the list of the recommended unread messages 960. The summary 965 can be displayed in a hover window when the cursor is at the list of the recommended unread messages 960. Alternatively, or additionally, the summary 965 can be included in the notification message 855, beside the list of recommended unread messages 960. In some examples, the notification message 955 includes a summary for some of the recommended unread messages. For example, when the recommended unread messages are organized by chat channels, a summary can be displayed for each chat channel included in the notification message 955. The summary for each chat channel can be displayed in a hover window when the cursor is over the corresponding chat channel included in the notification message 955. Alternatively, or additionally, the summary for each chat channel can be displayed in the notification message 955 when the chat channel is expanded in the notification message 955.

It can be appreciated that FIG. 7-9 are some unlimiting examples for displaying recommendations and summarizations of unread messages, and there can be other embodiments. For example, the recommendations and summarizations of the unread message can be displayed in a starred or other combinatory headings included in sidebar 515 in FIG. 5. The notification message of recommended unread messages can be generated automatically at a predetermined time, or at a user's request.

Now referring to FIG. 10, FIG. 10 shows an example method 1000 for recommending and summarizing unread messages. The example method 1000 will be discussed with respect to the system 400 shown in FIG. 4; however, any suitable system for recommending unread messages may be used.

At block 1002, a client device 340 accesses multiple unread messages associated with a user via an online chat platform. The online chat platform can be provided by the chat and video conference provider 310. The client device 340 associated with the user can access the online chat platform via a client-side application, for example the chat and video conference application 450 provided by the chat and video conference provider 310 and installed on the client device 340. The multiple unread messages may be in different chat channels for the user, for example, different contacts and chat groups. In some examples, the client device 340 receives a user request for recommending a subset of the multiple unread messages from the user. The user request can be a one-time request from the user via an input device (e.g., keyboard, mouse, etc.). Alternatively, or additionally, the user request can be a scheduled request set in the chat and video conference application 450 at a predetermined interval, for example, hourly, daily, or weekly.

At block 1004, the client device 340 selects one or more unread messages from the multiple unread messages using a first ML model. The chat and video conference application 450 installed on the client device 340 includes a customized recommendation engine 460. The customized recommendation engine 460 implements the first ML model for recommending unread messages. The first ML model can be initially trained by the chat and video conference provider 310, generally as described in FIG. 4. The initially trained first ML model can be transmitted to the client device 340 and customized with user data collected by the client device 340 associated with the user, such as what messages the user read, what channels the user interact with frequently, and user feedback for previously recommended unread messages. In some examples, the client and video conference provider 310 includes a recommendation engine 430 configured to select one or more unread messages from the multiple unread messages. The recommendation engine 430 can implement the first ML model trained by the chat and video conference provider 310. The first ML model in the recommendation engine 430 can also be retrained or fine-tuned with more user activity data or user feedback.

The first ML model can be a content-based model, an interaction-based model, or a combination of both. In some examples, the first ML model is an interaction-based model, such as a collaborative filtering model. The collaborative filtering model can use a neighbor-based algorithm for determining the similarity between an unread message and the derived features used in the collaborative filtering model. Alternatively, or additionally, the collaborative filtering model develops a feature model for the derived user features to predict a rating for an unread message. The feature model can be developed using Bayesian networks, clustering models, latent semantic models, and any suitable data mining or ML algorithms. The unread messages can be text, image, audio, video, or any other data format. The chat and video conference provider 310 or the chat and video conference application 450 installed on the client device 340 can convert the image, audio, or video into a computer-readable format for processing, for example using image analysis techniques or speech-to-text techniques.

At block 1006, the client device 340 provides an indication of the one or more selected unread messages to the user. The indication of the one or more selected unread messages can be provided to the user at a predetermined interval corresponding to the request by the user via an output device (e.g., display device). In some examples, the indication of the one or more selected unread messages is a notification message in a GUI of the chat and video conference application 350 installed on the client device 340. The notification message can be displayed in a specific chat channel or a designated page. The notification message can include a recommended list of unread messages including the one or more selected unread messages. The notification message can include links to the one or more selected unread messages in the recommended list. Alternatively, or additionally, the notification message can also include the content of the one or more selected unread messages. In some examples, the indication of the one or more selected unread messages can be provided to the user via Short Message Service (SMS), email, or any other suitable means.

The client device 340 can also request user feedback from the user regarding the relevancy of the one or more selected unread messages. In some examples, the notification message includes an input field, a sliding scale, or radio buttons for the user to provide feedback regarding the relevancy of the one or more selected unread messages. The client device 340 can update the first ML model based on the feedback input from the user. In some examples, the chat and video conference provider 310 provides the indication of the one or more unread messages via the client device 340. The chat and video conference provider 310 can also updated the first ML model implemented in the recommendation engine 430 based on the feedback input from the user.

At block 1008, the client device 340 generates a summary for at least one of the one or more unread messages using a second ML model. In some examples, the chat and video conference provider 310 initially trains the second ML model for summarization, generally as described in FIG. 3. The chat and video conference provider 310 then transmits the second ML model to the chat and video conference application 350 installed on the client device 340. The chat and video conference application 350 includes a customized summarization engine 470 implementing the initially trained second ML model for summarization. The customized summarization engine 470 can retrain and customize the second ML model with more use data collected by the client device 340 associated with the user. The second trained ML model can summarize some or all of the selected unread messages by the first trained ML model. Alternatively, or additionally, the second trained ML model operates independently of the first ML model to summarize some or all of the unread messages received by the user. In some examples, the chat and video conference provider 310 includes a summarization engine 440 configured to generate a summary for unread messages. The summarization engine 440 can implement the second ML model initially trained by the chat and video conference provider 310. The second ML model in the summarization engine 440 can also be retrained or fine-tuned with more user activity data or user feedback.

In some examples, the second ML model is a generative model, for example a transformer model. The chat and video conference provider 310 can train the second ML model for summarization, generally as described in FIG. 4. For example, the chat and video conference provider 310 can derive user features and corresponding weights, such as types of chat content with an importance score and types of contact with certain interaction frequency for the user or user group, to extract key phrases for summarization. In some examples, the chat and video conference provider 310 trains the second ML model to summarize using message sentences including the extracted key phrases. In some examples, the chat and video conference provider 310 trains the second ML model to generate new sentences to summarize the unread messages based on the derived user features with their weights using natural language processing techniques.

At block 1010, the client device 340 provides the summary of the at least one of the one or more selected unread messages. The summary of the one or more selected unread messages can be provided to the user at a predetermined interval corresponding to the request by the user. In some examples, the summary is displayed as a notification message in a GUI of the chat and video conference application 350 installed on the client device 340. The notification message can be displayed in a specific chat channel or a designated page. The recommended list of the one or more unread messages and the summary of the at least one of the one or more unread messages can be displayed in one notification message or separate notification messages. In some examples, the summary is displayed in a hover window over the recommended list of unread messages including the one or more selected unread messages. Similar to the indication of the one or more selected unread messages, the summary of the at least one of the one or more selected unread messages can be provided to the user via Short Message Service (SMS), email, or any other suitable means.

The client device 340 can also request user feedback from the user regarding the relevancy or accuracy of the summary of the at least one of the one or more selected unread messages. In some examples, the notification message includes an input field, a sliding scale, or radio buttons for the user to provide feedback regarding the relevancy or accuracy of the summary of at least one of the one or more selected unread messages or the accuracy of the summary. The second ML model implemented in the customized summarization engine 470 can be retrained or fine-tuned based on corresponding user feedback. In some examples, the chat and video conference provider 310 provides the summary of the at least one of the one or more unread messages via the client device 340. The chat and video conference provider 310 can also updated the second ML model implemented in the summarization engine 440 based on the feedback input from the user.

Figure 11:
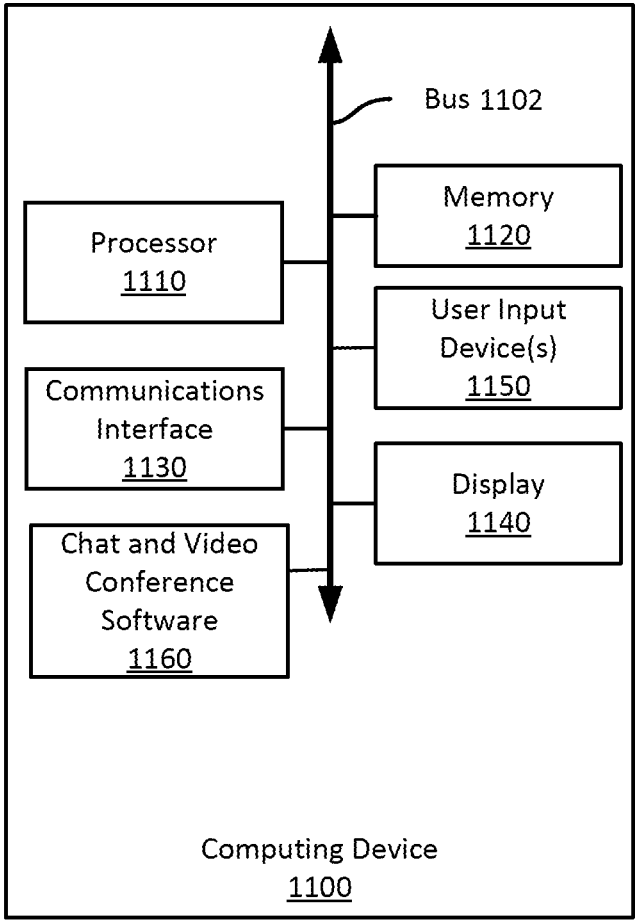
FIG. 11 shows an example computing device suitable for use in example systems or methods for recommending and summarizing unread messages.

Now referring to FIG. 11, FIG. 11 shows an example computing device 1100 suitable for use in example systems or methods for recommending and summarizing unread messages. The example computing device 1100 includes a processor 1110 which is in communication with the memory 1120 and other components of the computing device 1100 using one or more communications buses 1102. The processor 1110 is configured to execute processor-executable instructions stored in the memory 1120 to perform one or more methods for recommending or summarizing unread messages, such as part or all of the example method 1000, described above with respect to FIG. 10. The computing device, in this example, also includes one or more user input devices 1150, such as a keyboard, mouse, touchscreen, video input device (e.g., one or more cameras), microphone, etc., to accept user input. The computing device 1110 also includes a display 1140 to provide visual output to a user. The computing device 1110 may also include a video conference software 1160. The video conference software 1160 may include a chat client, a video conference platform, and any other software to enable communication from a first user to a second user.

The computing device 1100 also includes a communications interface 1030. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, by a client device associated with a user, a first trained machine learning (ML) model and a second trained ML model from an online chat platform based on user profile data associated with the user, wherein the online chat platform provides a plurality of trained ML models corresponding to a plurality of user profile types;
customizing, by the client device associated with the user, the first trained ML model based on user activity data associated with the user to obtain a first customized ML model;
customizing, by the client device associated with the user, the second trained ML model based on the user activity data associated with the user to obtain a second customized ML model;
accessing, by the client device, a plurality of unread messages associated with the user;
selecting, by the client device, one or more recommended unread messages from the plurality of unread messages using the first customized ML model;
generating, by the client device, a summary of the one or more recommended unread messages using the second customized ML model; and
providing, by the client device, an indication of the one or more recommended unread messages and the summary to the user.

2. The method of claim 1, wherein the user activity data comprises user actions associated with historical chat messages and user interactions with other users on the online chat platform.

3. The method of claim 1, wherein the first trained ML model is a collaborative filtering model.

4. The method of claim 1, wherein the indication of the one or more recommended unread messages is provided to the user at a predetermined interval.

5. The method of claim 1, further comprising receiving a user request for recommending a subset of unread messages, wherein the user request is a one-time request or an automatic scheduled request.

6. The method of claim 1, further comprising causing the indication of the one or more recommended unread messages to be displayed in a graphical user interface (GUI), wherein the indication of the one or more recommended unread messages is a notification message displayed in the GUI, wherein the notification message comprises links to the one or more recommended unread messages.

7. The method of claim 1, further comprising:
requesting user feedback regarding a relevancy of the one or more recommended unread messages;
receiving user feedback data from the user via an input device; and
fine-tuning the first trained ML model based on the user feedback data.

8. The method of claim 1, further comprising:
generating a summary of each of the one or more recommended unread messages; and
providing the summary of each of the one or more recommended unread messages to the user.

9. The method of claim 8, wherein the second trained ML model is a supervised learning model.

10. The method of claim 8, further comprising causing the summary of the one or more recommended unread messages to be displayed in a GUI, wherein the GUI comprises a hover window over the indication of the one or more recommended unread messages.

11. The method of claim 1, wherein the user profile data comprises a job title, a team name, a user location, chat contacts, or joined chat channels.

12. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

receive a first trained machine learning (ML) model and a second trained ML model from an online chat platform based on user profile data associated with a user, wherein the online chat platform provides a plurality of trained ML models corresponding to a plurality of user profile types;

customize the first trained ML model based on user activity data associated with the user to obtain a first customized ML model;

customize the second trained ML model based on the user activity data associated with the user to obtain a second customized ML model;

access a plurality of unread messages associated with the user;

select one or more recommended unread messages from the plurality of unread messages using the first customized ML model;

generate a summary of the one or more recommended unread messages using the second customized ML model; and provide an indication of the one or more recommended unread messages and the summary to the user.

13. The system of claim 12, wherein the user activity data comprises user actions associated with historical chat messages and user interactions with other users on the online chat platform.

14. The system of claim 12, the one or more processors are configured to execute further processor-executable instructions stored in the non-transitory computer-readable medium to:

receive a user request for recommending a subset of unread messages, wherein the user request is a one-time request or an automatic scheduled request.

15. The system of claim 12, wherein the one or more processors are configured to execute further processor-executable instructions stored in the non-transitory computer-readable medium to:

cause the indication of the one or more recommended unread messages to be displayed in a graphical user interface (GUI), wherein indication of the one or more recommended unread messages is a notification message displayed in the GUI, wherein the notification message comprises links to the one or more recommended unread messages.

16. The system of claim 12, wherein the one or more processors are configured to execute further processor-executable instructions stored in the non-transitory computer-readable medium to:

cause the summary of the one or more recommended unread messages to be displayed in a GUI, wherein the GUI comprises a hover window over the indication of the one or more recommended unread messages.

17. A non-transitory computer-readable medium comprising processor-executable instructions configured to cause one or more processors to:

receive a first trained machine learning (ML) model and a second trained ML model from an online chat platform based on user profile data associated with a user, wherein the online chat platform provides a plurality of trained ML models corresponding to a plurality of user profile types;

customize the first trained ML model based on user activity data associated with the user to obtain a first customized ML model;

customize the second trained ML model based on the user activity data associated with the user to obtain a second customized ML model;

access a plurality of unread messages associated with the user;

select one or more recommended unread messages from the plurality of unread messages using the first customized ML model;

generate a summary of the one or more recommended unread messages using the second customized ML model; and provide an indication of the one or more recommended unread messages and the summary to the user.

18. The non-transitory computer-readable medium of claim 17, further comprising processor-executable instructions configured to cause one or more processors to:

request user feedback regarding a relevancy of the one or more recommended unread messages;

receive user feedback data from the user via an input device; and fine-tune the first trained ML model based on the user feedback data.

19. The non-transitory computer-readable medium of claim 17, further comprising processor-executable instructions configured to cause one or more processors to:

cause the summary of the one or more recommended unread messages to be displayed in a GUI, wherein the GUI comprises a hover window over the indication of the one or more recommended unread messages.

* * * * *